Feb. 5, 1929.
C. AALBORG
1,700,870
CIRCUIT BREAKER
Filed Jan. 8, 1923
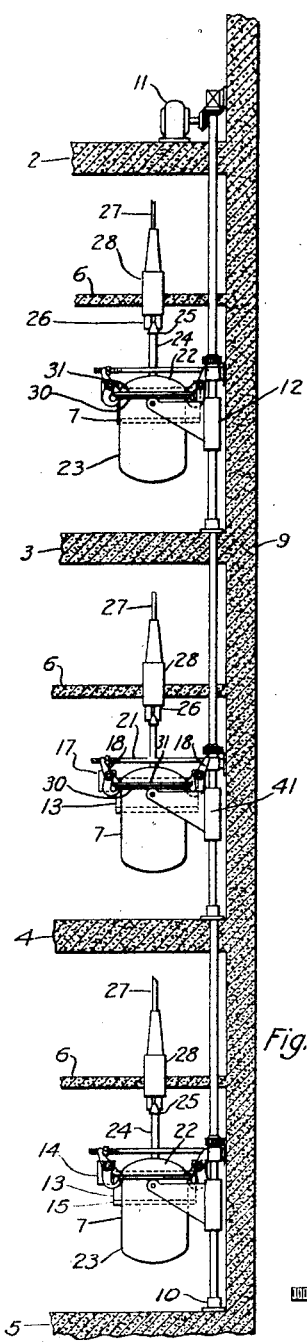
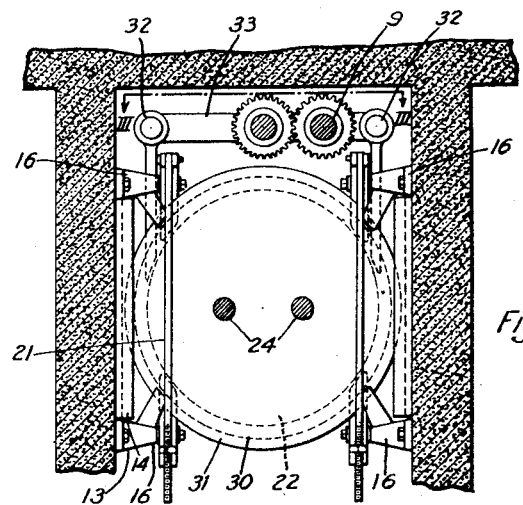
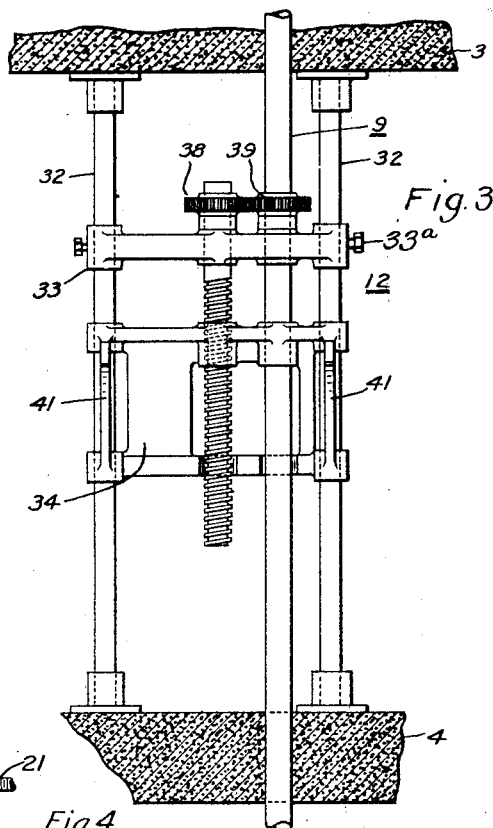
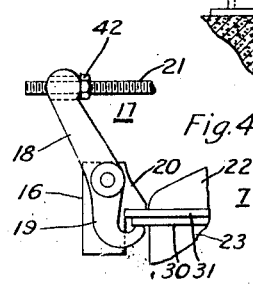
INVENTOR
Christian Aalborg
BY
ATTORNEY Patented Feb. 5, 1929.

1,700,870

UNITED STATES PATENT OFFICE.

CHRISTIAN AALBORG, OF PITTSBURGH, PENNSYLVANIA, ASSIGNOR TO WESTINGHOUSE ELECTRIC & MANUFACTURING COMPANY, A CORPORATION OF PENNSYLVANIA.

CIRCUIT BREAKER.

Application filed January 8, 1923. Serial No. 611,258.

My invention relates to circuit interrupters and more particularly to the construction of a power station having a plurality of circuit interrupters in spaced relation.

One object of my invention is to provide a power station in which the circuit interrupters are placed in vertical relation with minimum floor space, and at the expense of vertical space.

Another object of my invention is to provide means for simultaneously controlling the position of a plurality of circuit interrupters that are in vertical alinement.

It is a further object of my invention to provide means for the simultaneous disconnection of a plurality of circuit interrupters from electrical circuits and the lowering of the same for repair purposes.

It is also an object of my invention to provide a power station in which a plurality of circuit interrupters are placed in vertical alinement, each of the circuit interrupters controlling one phase of a polyphase electrical circuit, with means for simultaneously moving these circuit interrupters upwardly or downwardly as desired.

Another object of my invention is to provide a mechanism for accomplishing the aforementioned objects, the details of which will be hereinafter set forth at length.

In power stations as heretofore constructed, it has been customary to place the circuit interrupters on the same level or floor. This construction calls for a great deal of floor space, which in congested cities very materially adds to the difficulties of erecting power stations.

By my invention, the circuit interrupters are placed in vertical alinement and supported by means connected by a common mechanism, the latter being controlled by a power device that may, for convenience, be located approximately in vertical alinement with the circuit interrupters which it controls.

In the accompanying drawings:

Figure 1 is a sectional view of a portion of a power station embodying my invention;

Fig. 2 is a plan view of a circuit interrupter cell embodying my invention;

Fig. 3 is an enlarged rear view of the mechanism for operating one of the tank-lifting mechanisms; and Fig. 4 is a side view of a portion of the mechanism for supporting a circuit breaker and for connecting the casing parts.

In the preferred embodiment of my invention, a power station has a plurality of floors 2, 3, 4 and 5, or levels. A partition 6 extends horizontally between each pair of floors. Between each partition 6 and the floor therebeneath is placed a circuit interrupter 7. A shaft 9, which extends vertically through the floors 2, 3 and 4, and rests on a bearing 10 on the lower floor 5, is operatively connected by means of suitable gearing to an electric motor 11, which may, for convenience, be placed on the upper floor 2. The circuit interrupters 7 are arranged to be raised or lowered by tank-lifting mechanisms 12, one of which is shown in enlarged detail in Fig. 3. The tank-lifting mechanisms 12 are all operatively connected to the shaft 9 by suitable gear mechanisms.

Channel beams 13, which extend horizontally along the side walls of each circuit interrupter cell, comprise an upper flange 14 and a lower flange 15. Secured to the walls of each circuit interrupter cell, by means of brackets 16, is a quickly detachable supporting and connecting mechanism 17, which may be of any desired form but is preferably of the same general form as that shown and described herein. The supporting mechanism 17 comprises a pair of pivoted levers 18 having hooks 19 which co-operate with lugs 20, which may, for example, be integral with the brackets 16 to secure the circuit interrupters 7 in operative position. The supporting mechanisms comprise also connecting links 21 having screw-threaded portions and nuts thereon for securing the levers 18 in operative positions.

The circuit interrupters 7 may be of any desired type, comprising a cover portion 22 and a tank portion 23, which together constitute a casing. Electrical conductors 24 extend through the cover members 22 and terminate at the upper ends thereof in contact members 25. The contact members 25 co-act with contact members 26 of line conductors 27, that are provided with terminal bushings 28 which are supported by the several partitions 6. The contact members 25 and 26 constitute disconnecting switches that are automatically opened or closed according as the circuit breakers are lowered from or lifted into their normal operative positions.

Each tank 23 is provided with a flange 30, the diameter of which is less than that of a co-operating flange 31 of the cover member 22. The diameters of the flange members 30 and 31 are such that the tank member 23 may be actuated upwardly or downwardly without engaging the flange members of the beams 13 while the cover member 22 may be raised or lowered only between the limits constituted by the flanges of the beams 13.

The tank-lifting mechanism 12, which is shown in enlarged detail in Fig. 3, comprises a plurality of guides 32 that extend vertically between the several floors. Each of the pairs of guides 32 is connected by a member 33 and set screws 33ª. A movable member 34, or cross-head, is slidably mounted on the guides 32. The shaft 9 is journaled in both members 33 and 34 of each tank-lifting mechanism 12. A screw-threaded shaft is mounted centrally of the members 33 and 34 and has a threaded connection with the cross-head 34. The shaft 9 is connected to each of the threaded shafts 35 by means of gear wheels 38 and 39. The cross-head 34 supports a pair of arms 41 that are adapted to engage the flange 30 of the corresponding tank 23 when the tank-lifting mechanism is in its uppermost position.

It may be assumed that the circuit interrupters occupy the respective positions in which they are illustrated. It may be assumed also that it is desired to lower the circuit interrupters for some reason, such, for example, as for inspecting or repairing them. The circuit of the motor 11 is completed by any suitable means (not shown) for operation of the motor in such direction as to raise the arms 41 into engagement with the flanges 30 of the corresponding circuit interrupter tanks 23.

The adjusting nuts 42 on the connecting links 21 are manually rotated on the latter to permit the upper ends of the levers 18 to move inwardly and thereby cause the hooks 19 to be withdrawn out of engagement with the flanges 30 of the tank 23. The weight of each circuit interrupter is then supported by the corresponding pairs of arms 41.

The motor 11 is then operated in such direction as to effect the lowering of the cross-head 34 and the associated parts, together with the circuit interrupters 7. The initial downward movement of the circuit interrupter effects the separation of the contact members 25 and 26 to insure that the operating mechanism of the circuit breaker is not electrically connected. When the flanges 31 of the cover members 22 engage the lower flanges 15 of the channels 13, the cover members 22 and the operating mechanisms of the circuit interrupters are supported thereby, while the tanks 23 and the insulating oil therein may be lowered to expose the mechanism of the circuit interrupter. If desired, the tanks 23 may be received upon suitable trucks by means of which they may be removed to any convenient or desired location during the inspection and repair of the circuit interrupter mechanism.

When it is desired to return the circuit breakers to operative position, the tanks are again placed upon the arms 41 and the motor operated to effect the raising of the cross-heads 34 and the associated parts until the tanks 23 engage the cover members 22. Continued operation of the motor effects the lifting of the entire circuit interrupters until the cover members 22 engage the stationary lugs 20. When the circuit interrupters reach this position, the contact members 25 and 26 are again in engagement. The several supporting and connecting mechanisms 17 are then placed in operative position by means of adjusting nuts 42, whereupon the circuit interrupters are supported by means of the hooks 19. The levers 18 operate also to securely clamp the cover members and the tank members together and, by positioning them at the same relative heights, to compensate for any inequalities in the relative distances between the arms 41 and the corresponding channels 13.

It will be appreciated that I have provided a system whereby a plurality of circuit interrupters may be simultaneously connected to, or disconnected from, the line conductors of a polyphase electrical circuit. I have provided also a mechanism whereby a single power device is operative to simultaneously raise or lower a plurality of circuit interrupters. These results are accomplished by a mechanism which occupies minimum floor space and that may be controlled by a single switch or other controlling device.

While I have shown and described my invention in its preferred form, it is apparent that modifications may be made in the arrangement of the mechanism for controlling the positions of the circuit interrupters without departing from the spirit of my invention. I desire, therefore, to be limited only by the scope of the appended claims.

I claim as my invention:

1. In electrical apparatus, a plurality of similar circuit interrupters at different levels, adjustable supporting means for the several circuit interrupters at each level, and means for simultaneously operating said supporting means.

2. In electrical apparatus, a plurality of supports, arms carried by said supports, an electrical device supported by said arms, an electrical terminal secured in spaced relation to said electrical device, a co-operating electrical contact member secured to said electrical device, and means for adjusting the positions of said arms whereby said electrical device may be connected to, or disconnected from, an electrical circuit.

3. In electrical apparatus, a plurality of cells at different levels, each of said cells containing a plurality of supports, arms carried by said supports, means for adjusting the position of said arms, an electrical device supported by said arms, an electrical terminal secured in spaced relation to said electrical device, a co-operating electrical contact secured to said electrical device, and means for simultaneously actuating the adjusting means for a plurality of cells whereby a plurality of electrical devices may be simultaneously connected to, or disconnected from, an electrical circuit.

4. In combination, an electrical device, means for adjusting the position of said electrical device as a unit, and means for limiting the amount of travel of a portion of said electrical device and means whereby the movement of the electrical device as a unit connects it to or disconnects it from an electrical circuit.

5. In combination, an electrical device comprising a cover portion and a tank portion, adjustable means for supporting and positioning the said electrical device as a unit, and means comprising a channel iron for engaging and limiting the movement of said cover portion between the flanges thereof.

6. In combination, an electrical device comprising a cover portion and a tank portion, adjustable means for supporting and positioning the said electrical device as a unit, and means for limiting the movement of said cover portion comprising projections between which said cover extends.

7. In combination, an electrical device comprising a cover portion and a tank portion, means for adjusting the position of said electrical device as a unit, means for limiting the movement of said cover portion, and means for simultaneously operating a plurality of similar electrical devices.

8. In combination, a plurality of electrical devices each comprising a cover portion and a tank portion, means for adjusting the position of said electrical devices as units, means for limiting the movement of said cover portions, and means for simultaneously actuating a plurality of said electrical devices, said means comprising a motor and connecting shafting and gears.

9. In an electrical device, a plurality of circuit interrupters, and common controlling means therefor comprising a motor and a system of connected mechanical members whereby said circuit interrupters are simultaneously disconnected from electrical circuits, moved as a unit for a certain distance, a portion of each circuit interrupter is left in one position, and the remaining portion thereof is then moved to a second position to permit access thereto.

10. In an electrical apparatus a plurality of circuit interrupters each of which comprises a cover portion and a body portion, and means comprising a motor and a plurality of mechanical elements actuated thereby for simultaneously disconnecting said circuit interrupters from their associated electrical circuits, simultaneously moving said circuit interrupters as units for a distance, suspending the cover portions, and then moving the body portions in order to permit access to the mechanism of each circuit interrupter.

In testimony whereof, I have hereunto subscribed my name this second day of January, 1923.

CHRISTIAN AALBORG.